D. W. LEAR & M. F. CONNETT.
Waiter's Tray.
No. 226,526. Patented April 13, 1880.
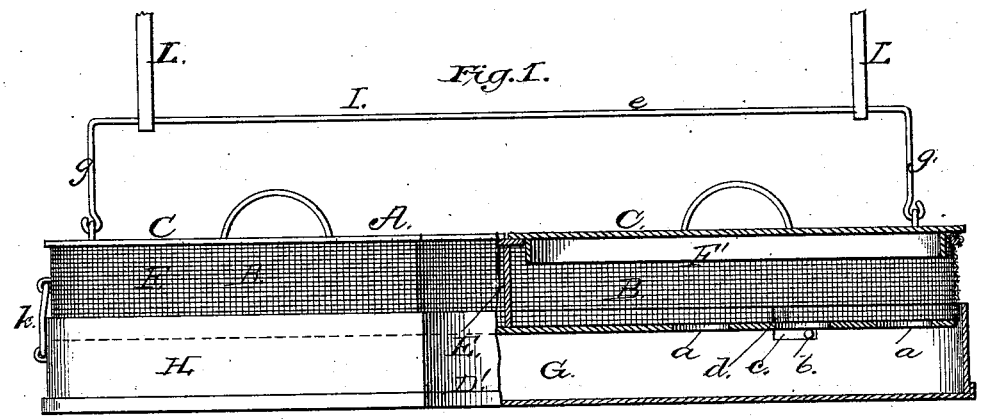
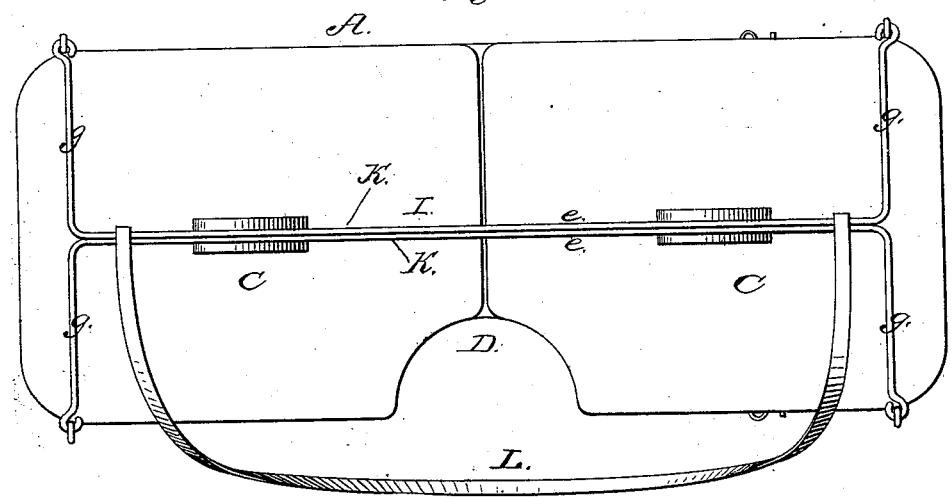
WITNESSES
John A. Ellis
Francis J. Masi
INVENTORS
D. W. Lear,
M. F. Connett,
by E. W. Anderson
their ATTORNEY

UNITED STATES PATENT OFFICE.

DERREL W. LEAR AND MATTHEW F. CONNETT, OF LITTLE ROCK, ARK.

WAITER'S TRAY.

SPECIFICATION forming part of Letters Patent No. 226,526, dated April 13, 1880.

Application filed February 7, 1880.

*To all whom it may concern:*

Be it known that we, DERREL W. LEAR and MATTHEW F. CONNETT, of Little Rock, in the county of Pulaski and State of Arkansas, have invented a new and valuable Improvement in Waiters' Trays; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of my improved waiter's tray, partly in section; and Fig. 2 is a top view of the main tray.

This invention has relation to trays for waiters' use in carrying meals; and it consists in the construction and novel arrangement of the main tray, having a perforated side wall and a concavity in one side to bring the center of gravity in vertical line with the bearer's arm, the partition and covers, and the bail handle or handles attached to the four corners to prevent tipping; also, in connection therewith, of the vessel-holes in the bottom of the tray proper and the under tray detachably connected to the main tray, all as hereinafter shown and described.

In the accompanying drawings, the letter A designates the main tray, having a side wall, B, extending around it to prevent the dishes from falling off and to support the covers C. This side wall is usually perforated, so that the steam and vapors can readily pass off, the covers preventing these emanations from rising upward, as well as protecting the provisions from being affected by dust or other extraneous matter falling therein.

The tray is elongated in form, and on one side is provided with a central concavity, D, of sufficient size to encircle about one-half of the bearer, so that his arm, hanging naturally, will, in supporting the tray, be in vertical line, or nearly so, with the horizontal portion of the handle, or with the plane passing through the center of gravity when the tray is fairly loaded.

A central partition, E, serves to strengthen the tray at its middle or narrow portion, and to separate the chamber F at one end of the tray from that F' at the other, this separation being desirable in carrying articles of different character. Sometimes a portion of the meal is required to be kept cold, while the other part should be heated, and in this case one of the compartments F' is provided with holes $a$ in its bottom to receive the lower portions of the vessels or dishes, which are thereby exposed to the heat of a lamp or live coals contained in the under tray, G. This is also provided with a rim-wall, H, which extends up a short distance above the bottom of the main tray, being made of corresponding form, with a concavity, D', in its side, and is attached to studs $b$ of the main tray by means of sliding slots $c$ near its upper edge, said slots having at one end offset notches or vertical ways $d$, whereby the studs are introduced or detached according to requirement. These sliding catches are provided near one end of the tray, the other end being connected to the under tray by means of a single hook or catch, $k$.

The handle I is usually made double, consisting of two bails, K, having horizontal portions $e$ of some length, which are connected to the four corners of the tray by inclined arms $g$, serving to hold the tray squarely, and giving the waiter full control of it to prevent tipping, and enabling him to shift his hand, and grasping the horizontal portion where required by the position of the articles within.

Instead of using a double handle a single one having inclined arms at each end may be employed; but the double handle is preferred, as the two bails may be thrown apart out of the way when the covers are to be removed or the dishes handled.

A strap, L, may be employed for the purpose of suspending the tray, passing over the shoulder of the bearer, and thereby leaving his hands free to manipulate the covers and dishes without putting the tray down upon a table or other support.

Usually two trays will be carried, forming a pair, the suspending-strap passing over the shoulders from one to the other.

Having described this invention, what we claim, and desire to secure by Letters Patent, is—

1. The elongated waiter's tray A, having the broad end chambers, F F', perforated side wall, B, side concavity, D, bracing-partition E, and handle I, extending horizontally above the covers C, and having the inclined arms $g$ extending to the four corners of the tray, substantially as specified.

2. In a waiter's tray having broad end chambers, F F', perforated bottom and side concavity, D, an under tray, G, having sliding catches $c$, hook $k$, and side concavity, D', said under tray conforming in shape to the main tray and detachable therefrom, substantially as specified.

In testimony that we claim the above we have hereunto subscribed our names in the presence of two witnesses.

DERREL W. LEAR.
MATTHEW F. CONNETT.

Witnesses:
T. P. BRASHEAR,
C. B. MYERS.